(12) United States Patent
Massara et al.

(10) Patent No.: US 11,992,986 B2
(45) Date of Patent: May 28, 2024

(54) INJECTION MOLDING TOOL

(71) Applicant: THERMOPLAY S.p.A., Pont St. Martin (IT)

(72) Inventors: Roberto Massara, Burolo (IT); Genny Garda, Settimo Vittone (IT)

(73) Assignee: THERMOPLAY S.P.A., Pont St. Martin (IT)

( * ) Notice: Subject to any disclaimer, the term of this patent is extended or adjusted under 35 U.S.C. 154(b) by 0 days.

(21) Appl. No.: 17/768,172

(22) PCT Filed: Oct. 2, 2020

(86) PCT No.: PCT/EP2020/077751
§ 371 (c)(1),
(2) Date: Apr. 11, 2022

(87) PCT Pub. No.: WO2021/073905
PCT Pub. Date: Apr. 22, 2021

(65) Prior Publication Data
US 2024/0092002 A1  Mar. 21, 2024

(30) Foreign Application Priority Data

Oct. 16, 2019 (DE) .......................... 102019127960.7

(51) Int. Cl.
*B29C 45/27* (2006.01)
(52) U.S. Cl.
CPC ........ *B29C 45/278* (2013.01); *B29C 45/2737* (2013.01); *B29C 2045/2761* (2013.01)
(58) Field of Classification Search
CPC .............. B29C 45/2737; B29C 45/278; B29C 2045/2761
See application file for complete search history.

(56) References Cited

U.S. PATENT DOCUMENTS 4,854,851 A   8/1989   Gellert
5,162,125 A   11/1992  Akselrud et al.
(Continued)

FOREIGN PATENT DOCUMENTS

CN   204431649 U   7/2015
DE   4415506 A1    11/1995
(Continued)

OTHER PUBLICATIONS

International Search Report, including translation, for PCT/EP2020/077751 dated Jan. 12, 2021.
(Continued)

*Primary Examiner* — James Sanders
(74) *Attorney, Agent, or Firm* — CANTOR COLBURN LLP

(57) ABSTRACT

The invention relates to an injection molding tool having a nozzle plate which comprises a first through-hole in an axial direction, in which first through-hole an injection molding nozzle is arranged extending in the axial direction. The injection molding tool further includes a cavity plate which comprises at least one cavity half into which a second through-hole, which is arranged in the cavity plate and coaxially with respect to the first through-hole, opens. A nozzle bushing, which encloses the injection molding nozzle at least in certain regions in the assembled state, is arranged in the second through-hole. The nozzle bushing is operatively connected to the cavity plate and/or nozzle plate by way of an operative connection means, wherein the nozzle bushing and the operative connection means are operatively connected to one another at least in the axial direction.

17 Claims, 4 Drawing Sheets

(56) References Cited

U.S. PATENT DOCUMENTS

| | | | |
|---|---|---|---|
| 7,025,585 | B2 | 4/2006 | Gellert |
| 9,272,453 | B1 | 3/2016 | Keir et al. |
| 2007/0212444 | A1 | 9/2007 | Fairy |
| 2008/0131552 | A1 | 6/2008 | Gaillard et al. |
| 2010/0183763 | A1 | 7/2010 | Babin et al. |

FOREIGN PATENT DOCUMENTS

| | | |
|---|---|---|
| DE | 112007002859 | 10/2009 |
| DE | 102012219251 A1 | 4/2014 |
| EP | 0480223 A1 | 4/1992 |
| EP | 3321060 A1 | 5/2018 |
| JP | H0596578 A | 4/1993 |
| JP | H05177664 A | 7/1993 |
| JP | H05200790 A | 8/1993 |
| WO | 2008064458 A1 | 6/2008 |
| WO | 2009097303 A1 | 8/2009 |

OTHER PUBLICATIONS

German Office Action for DE102019127960.7 dated May 5, 2020.
German Office Action for German Application No. 10 2019 127 960.7; Report Mail Date Feb. 7, 2024 (9 Pages—with machine translation).
Chinese Office Action for Chinese Application No. 202080072762.6; Report Mail Date Jan. 23, 2024 (24 Pages—with English Translation).

INJECTION MOLDING TOOL

CROSS-REFERENCE TO RELATED APPLICATIONS

This application is a U.S. National Stage Application of International PCT Application No. PCT/EP2020/077751, filed on Oct. 2, 2020, that claims priority to German Application No. DE102019127960.7, filed on Oct. 16, 2019, which are all hereby incorporated by reference in their entirety.

The present invention is in the field of injection molding tools for the production of parts by injection molding in particular of thermoplastic materials.

BACKGROUND OF THE INVENTION

In injection molding tools, injection molding nozzles are surrounded at least in the region of the nozzle tip by a nozzle bushing. The nozzle bushing is fastened to a tool plate of the injection molding tool. It serves to protect the sensitive injection molding nozzle and, if necessary, to thermally insulate it. Depending on the application, it can also be flooded, at least in certain regions, with molten injection molding material. The nozzle bushings known from the prior art are not optimal for the cabling of the heater or of the sensors of the injection molding nozzle. Furthermore, it is necessary for a specific nozzle bushing to be produced for each injection molding tool.

CN204196176U was published on 3 Nov. 2015 in the name of Synventive Molding Solutions (Suzhou) Co., Ltd. and relates to a nozzle bushing for water cooling for a hot runner nozzle. The nozzle bushing includes a nozzle bushing body that surrounds the hot runner nozzle. A first seal ring and a second seal ring are arranged circumferentially at the front end and rear end of the nozzle bushing body, respectively. Furthermore, the annular nozzle bushing pressure block is fixed to a cavity plate by a multiplicity of screws.

EP1680247A1 was published on Jul. 19, 2019 in the name of Husky Injection Molding and relates to a sprue apparatus for use in a molding apparatus for connecting the melt channel of a molding machine nozzle to a runner system of a molding apparatus. The sprue apparatus includes a plurality of thermal regulators that regulate a plurality of thermal zones that subdivide the length of the sprue apparatus for localized temperature control to assist a molding process. The multiplicity of zones can be thermally regulated to allow for a substantially leak-free connection between the machine nozzle and the molding apparatus. The sprue apparatus may include an isolating coupler that substantially isolates a heated sprue bushing from the carriage force.

SUMMARY OF THE INVENTION

An object of the invention is to disclose an injection molding tool having a nozzle bushing that is improved compared with the prior art.

In comparison with the prior art, the injection molding tool and a nozzle bushing operatively connected thereto advantageously have a construction as described below.

The injection molding tool includes a nozzle plate, which comprises a first through-hole passing through it in an axial direction. This first through-hole generally runs perpendicularly from a first plate surface to a second plate surface which extends essentially parallel thereto. The rear part of an injection molding nozzle is arranged in said first through-hole extending in the axial direction. The nozzle plate usually comprises a plurality of first through-holes in which injection molding nozzles are arranged accordingly.

Furthermore, the injection molding tool includes a cavity plate which comprises at least one first cavity half which, when the injection molding tool is in the closed state, forms a cavity with a second cavity half in a further cavity plate. During the injection molding process, molten material is injected into said cavity into the cavity through an outlet opening of the injection molding nozzle to produce a part.

The cavity plate comprises a second through-hole passing through it, which is arranged coaxially with respect to the first through-hole and opens into the first cavity half. This second through-hole generally runs perpendicularly from a first plate surface to a second plate surface which extends essentially parallel thereto and in which the first cavity half is arranged. The front part of the injection molding nozzle is arranged in the second through-hole extending in the axial direction. The nozzle plate usually comprises a plurality of second through-holes in which injection molding nozzles are arranged accordingly.

The injection molding nozzles usually run from the first through-hole into the second through-hole. A respective nozzle bushing, which encloses the injection molding nozzle at least in the front region in the assembled state, is arranged in the second through-hole. In the region of the cavity-side end, the nozzle bushing comprises an opening by way of which the outlet opening of the injection molding nozzle communicates with the first cavity half during the injection molding operation.

In contrast to the prior art, the nozzle bushing is operatively connected to the cavity plate and/or nozzle plate at least in the axial direction by way of an operative connection means. The nozzle bushing and the operative connection means are advantageously configured in two parts and so as to be detachable from one another. To increase the compatibility with different installation situations, the operative connection means may be operatively connected to the nozzle bushing by way of a standardized interface. The operative connection means may assume various configurations.

As described in more detail below, good results can be achieved with a flange plate or a threaded bushing as operative connection means, particularly if these can be operatively connected in different directions. An advantage of this construction is a certain modularity of the components used, which can thus be suitable for different installation situations. Depending on the configuration of the cavity plate and the nozzle plate and the respective through-holes that are present, an appropriate nozzle bushing and an appropriate operative connection means can be assembled for the injection molding nozzle intended for use.

By virtue of the fact that the nozzle bushing does not have to extend significantly into the nozzle plate, there is the advantage that it is possible for a cable channel to be arranged between the nozzle plate and an adjacent cavity plate, for example cabling for a nozzle heater and/or for a sensor arranged in the region of the injection molding nozzle running in said cable channel. Depending on the configuration, the cable channel may run in the cavity plate and/or the nozzle plate. Arranging the cabling in a cable channel arranged between the plates has the advantage that the cabling can, as a result, be arranged so as to be protected from external influences.

The operative connection means for connecting the nozzle bushing to the nozzle plate and/or cavity plate is advantageously arranged between the nozzle plate and the cavity plate.

A non-exhaustive selection of possible operative connection means is described in more detail below. In an advantageous embodiment, the operative connection means includes a flange plate. This flange plate comprises a central opening in which the nozzle bushing is arranged in the assembled state. The flange plate is advantageously fastened to the nozzle plate and/or the cavity plate in the axial direction by means of one or more screws. Alternatively, the operative connection means includes a threaded bushing with a central opening in which the nozzle bushing is arranged in the assembled state. The threaded bushing may be screwed to the nozzle plate and/or the cavity plate in the axial direction by way of a threaded connection.

To increase the flexibility, the operative connection means may be designed in such a way that the central opening can be used to slide it onto the nozzle bushing in two orientations. In other words, the threaded bushing or the flange plate may be slid onto the nozzle bushing in a longitudinal direction. Depending on whether it is intended to be connected to the nozzle plate or the cavity plate, the threaded bushing or the flange plate may be slid onto the nozzle bushing in the longitudinal direction in a first orientation or in an orientation rotated through 180 degrees about a transverse axis. This means that the threaded bushing can be connected to the cavity plate in the first orientation and to the nozzle plate in the alternative second orientation. The same combination of injection molding nozzle, nozzle bushing and operative connection means can thus be arranged in different ways and can therefore be installed in injection molding tools of different construction.

In order to establish an operative connection between the nozzle bushing and the operative connection means, the operative connection means may comprise a first stop surface and the nozzle bushing may comprise a second stop surface. In the assembled state, these stop surfaces advantageously prevent the nozzle bushing from being displaced in relation to the cavity plate and/or nozzle plate counter to the direction of the melt flow. The pressure that prevails during production on a cavity-side end of the nozzle bushing can be transmitted to the operative connection means via the stop surfaces and be compensated for by said operative connection means. Preferably, a securing means, which cooperates with the nozzle bushing in the assembled state and prevents, prevents the nozzle bushing from being displaced in relation to the operative connection means in the direction of the melt flow. The cooperation between the operative connection means and the securing means has the effect of retaining and/or positioning the nozzle bushing in relation to the cavity plate and/or nozzle plate at least in the axial direction. Good results can be achieved if the securing means includes at least one of the following elements: snap ring, threaded nut.

Depending on the configuration of the nozzle, the nozzle bushing is configured so as to taper in cross section, at least in one portion, in the direction of the melt flow. It may also comprise a seat for the cavity-side end of the injection molding nozzle such that, in the assembled state, it has an at least supportive function as a holder for the injection molding nozzle used.

If required, the nozzle bushing may comprise a first sealing means, which cooperates in a sealing manner with an inner surface of the second through-hole in the assembled state. The first sealing means is usually arranged on an outer side of the nozzle bushing. Undesired escape of molten material in the axial direction between the nozzle bushing and the cavity plate can be prevented by a correspondingly designed first sealing means. Depending on the application, a correspondingly designed first sealing means may be used to seal a cooling channel, as described further below. Good results are achieved when the first sealing means includes at least one of the following elements: circumferential bead with sealing surface, O-ring, etc. The first sealing means is preferably arranged in the longitudinal direction of the nozzle bushing, in a range of 20% to 80%, between the cavity-side end of the nozzle bushings and the second stop surface. As a rule, the first sealing means seals in the radial direction with respect to an inner surface of the second through-hole. If required, a second sealing means may be arranged below the first between the nozzle bushing and an inner surface of the second through-hole and/or the injection molding nozzle. The second sealing means is preferably arranged in the region of a tapered portion of the nozzle bushing. The second sealing means advantageously cooperates in the axial direction with a tapered portion of the second through-hole. Good results are achieved when the second sealing means includes at least one of the following elements: circumferential bead with sealing surface, O-ring, etc.

Depending on the area of application and configuration, the nozzle bushing comprises a third sealing means, which is arranged in the region of the outlet opening of the injection molding nozzle between the cavity-side end of the injection molding nozzle and the nozzle bushing and cooperates in a sealing manner with the injection molding nozzle.

In an actively cooled embodiment, a hollow space running around the nozzle bushing between the first and the second sealing means may be part of a coolant channel, the supply and discharge lines of which are advantageously arranged in the cavity plate.

The nozzle bushing is advantageously configured to be substantially rotationally symmetrical about its longitudinal axis. If necessary, the nozzle bushing may be supported against undesired rotation in relation to the cavity plate in the circumferential direction by way of an anti-rotation means.

Aspects of the invention are explained in more detail on the basis of the exemplary embodiments shown in the figures below and the associated description. In the figures.

Figure 1:
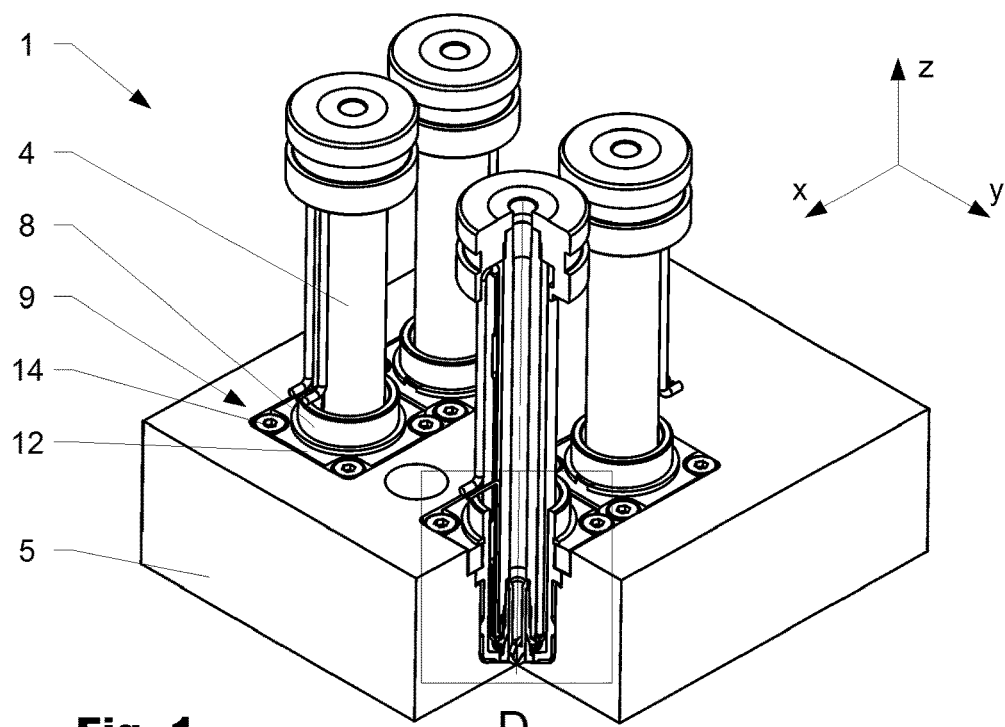
FIG. 1 shows a perspective view of a first variation of an injection molding tool according to the invention with a detail showing the internal construction.
Figure 2:
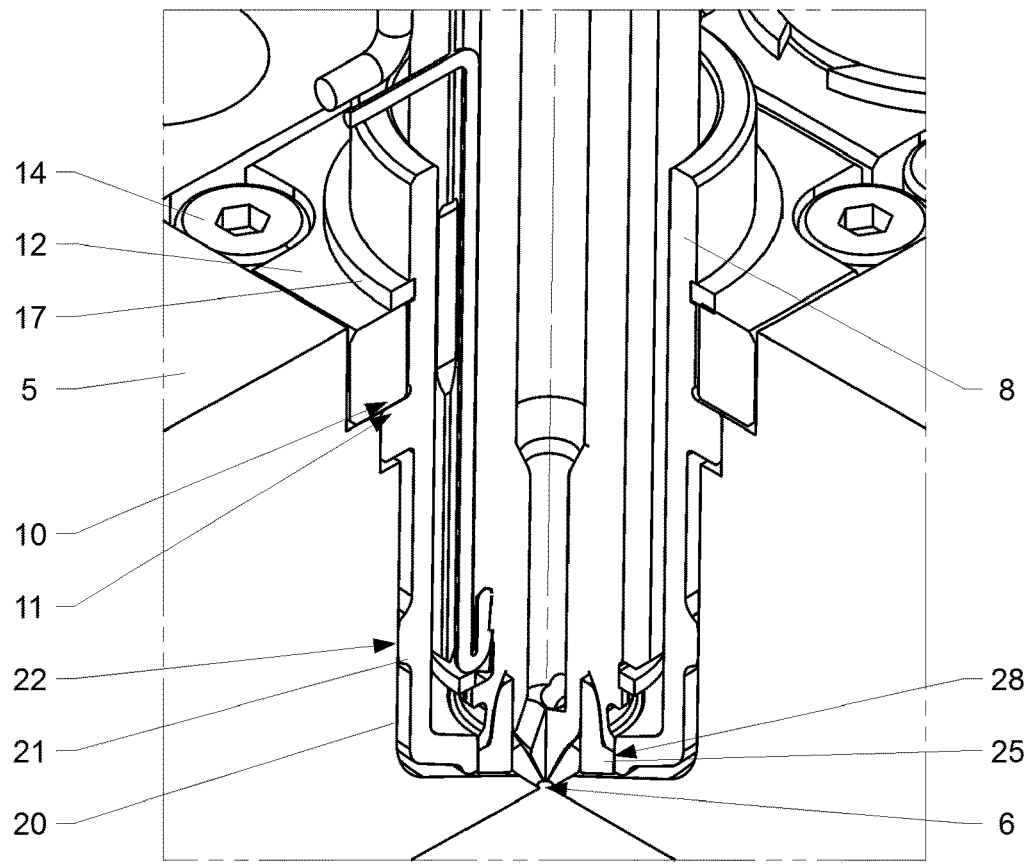
FIG. 2 shows an enlarged illustration of the detail from FIG. 1, which is denoted by D in said figure.
Figure 7:
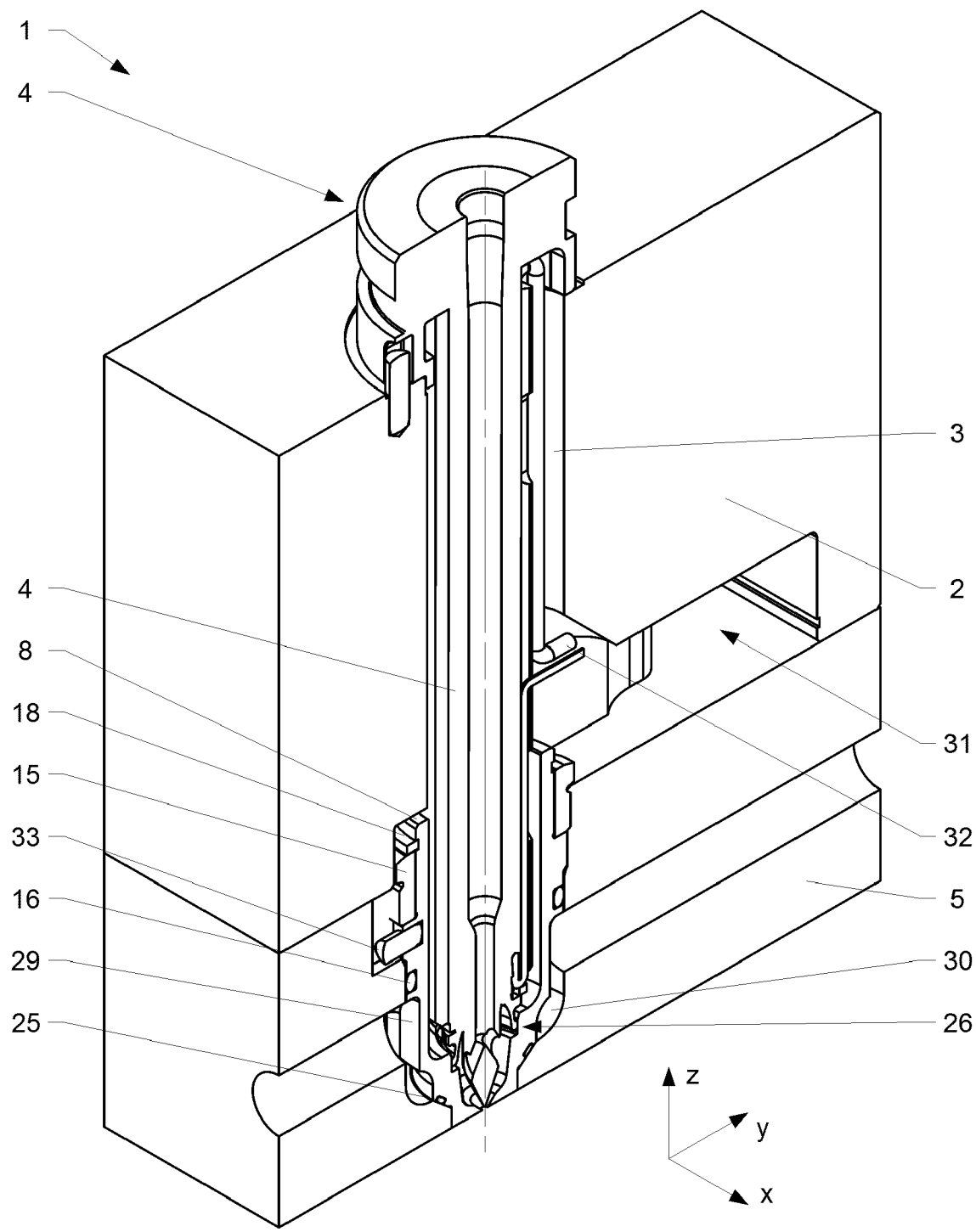
FIG. 7 shows a perspective sectional illustration of a second variation of an injection molding tool with a second variation of the nozzle bushing.
Figure 8:
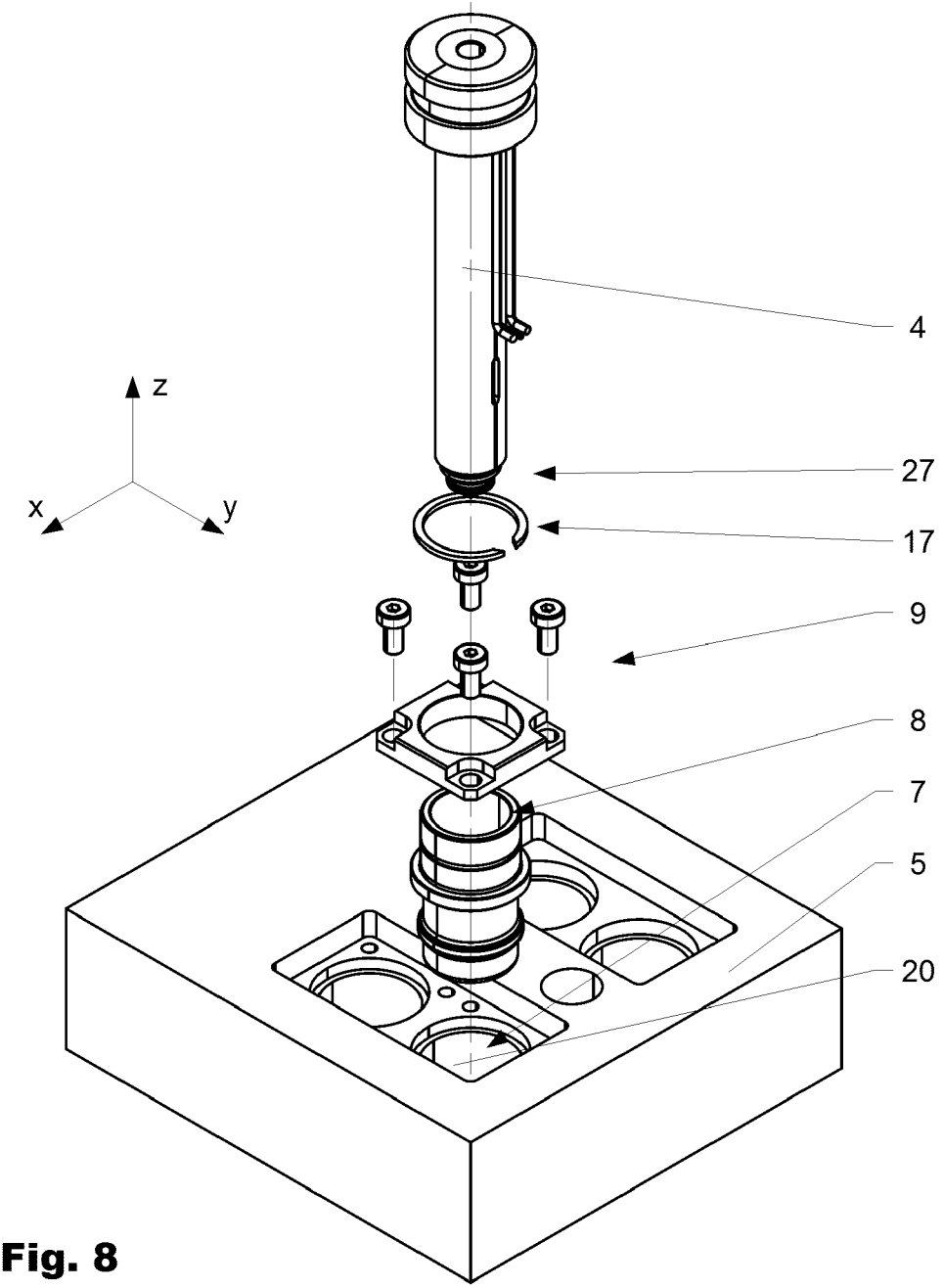
FIG. 8 shows a perspective view of the first variation of the injection molding tool of FIG. 1 in an exploded illustration with the nozzle bushing and the operative connection means of FIG. 3.

FIGS. 1, 2, and 8 show a first variation of an injection molding tool 1 according to the invention. The injection molding tool 1 includes a nozzle plate 2, as can be seen in FIG. 7, which comprises a first through-hole 3 passing through it in an axial direction (z-direction). Furthermore, the injection molding tool 1 includes a cavity plate 5, this comprising at least one cavity half 6 into which a second through-hole 7, which is arranged in the cavity plate 5 and passes through it, opens. The second through-hole 7 is arranged coaxially with respect to the first through-hole 3. An injection molding nozzle 4 is arranged in the first through-hole 3 extending in the axial direction z. The injection molding nozzle 4 also runs from the first through-hole 3 into the second through-hole 7. A first variation of a nozzle bushing 8, which encloses the injection molding nozzle 4 at least in certain regions in the assembled state, is depicted arranged in the second through-hole 7, as can be seen in FIGS. 1, 2.

A variation of the cavity plate 5, in which a plurality of second through-holes 7 are arranged, can be seen in FIGS. 1 and 8. The cavity plate 5 and the nozzle plate 2 adjoin one another in the assembled state, which is shown in FIG. 7, in a plane xy perpendicular to the axial direction z. In some variants, the cavity plate 5 and the nozzle plate 2 delimit an interposed cable channel 31. The cable channel 31, which runs in the nozzle plate 2, can be seen in FIG. 7. Cabling 32 for, for example, the nozzle heater of the injection molding nozzle 4 is laid in this cable channel 31.

FIGS. 1, 2, 7 and 8 show various embodiments of the injection molding tool 1 and the nozzle bushing 8, which is operatively connected to the cavity plate 5 or nozzle plate 2 by way of an operative connection means 9. In this case, the operative connection means 9 is arranged between the nozzle plate 2 and the cavity plate 5. Furthermore, the nozzle bushing 8 and the operative connection means 9 are operatively connected to one another at least in the axial direction z.

Figure 3:
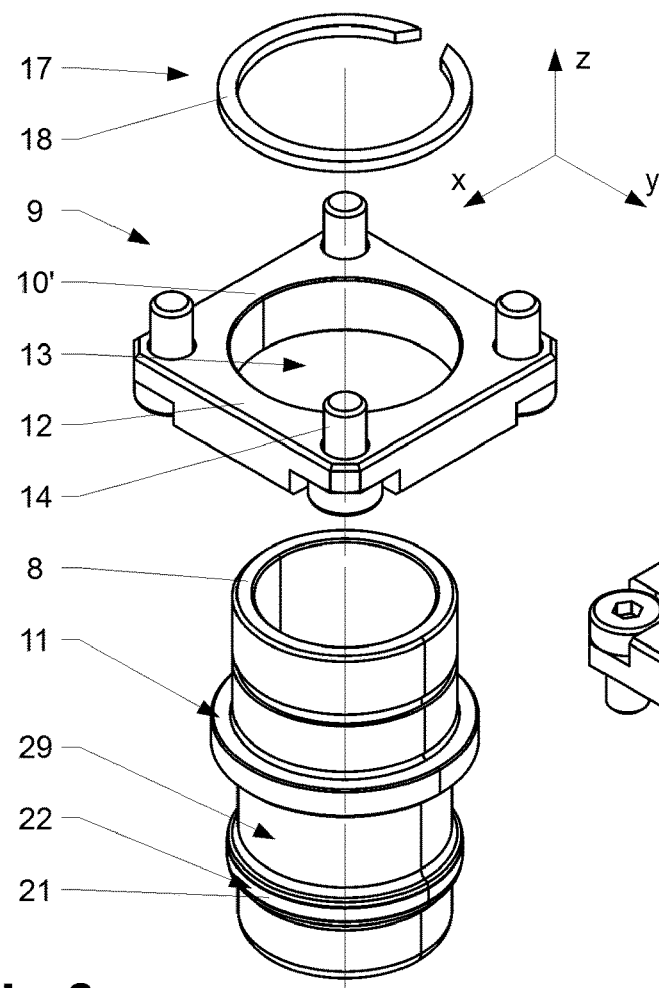
FIG. 3 shows a first variation of a nozzle bushing according to the invention with a first variation of an operative connection means in an exploded illustration.
Figure 4:
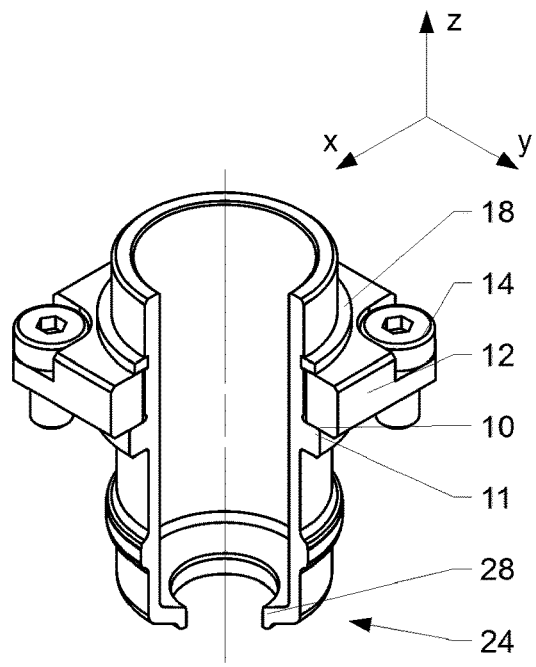
FIG. 4 shows the nozzle bushing with the operative connection means of FIG. 3, which has been slid onto the nozzle bushing in a further orientation, with a detail illustrating the internal construction.

A first variation of the nozzle bushing 8 with various embodiments of the operative connection means 9 is shown in FIGS. 3 to 6. In FIGS. 3 and 4, the operative connection means 9 is a flange plate 12. This flange plate comprises a central opening 13 in which the nozzle bushing 8 is arranged in the assembled state. In the variations illustrated, the flange plate 12 is fastened to the nozzle plate 2 or the cavity plate 5 in the axial direction z by means of a plurality of screws 14. In FIGS. and 6, the operative connection means 9 is a threaded bushing 15. This threaded bushing comprises a central opening 13 in which the nozzle bushing 8 is arranged in the assembled state. The threaded bushing 15 is fastened to the nozzle plate 2 or the cavity plate 5 in the axial direction z by means of a threaded connection.

In order to establish an operative connection between the nozzle bushing 8 and the operative connection means 9, the operative connection means 9 comprises a first stop surface 10 and the nozzle bushing 8 comprises a second stop surface 11. In the assembled state, these stop surfaces 10, 11 prevent the nozzle bushing 8 from being displaced in relation to the cavity plate 5 and/or nozzle plate 2 counter to the direction of the melt flow (−z). A securing means 17, which cooperates with the nozzle bushing 8 in the assembled state, prevents the nozzle bushing 8 from being displaced in relation to the operative connection means 9 in the direction of the melt flow (−z). In the variations shown, the securing means 17 includes a snap ring 18. The cooperation between the operative connection means 9 and the securing means 17 has the effect of retaining and/or positioning the nozzle bushing 8 in relation to the cavity plate 5 and/or nozzle plate 2 at least in the axial direction z.

Figure 5:
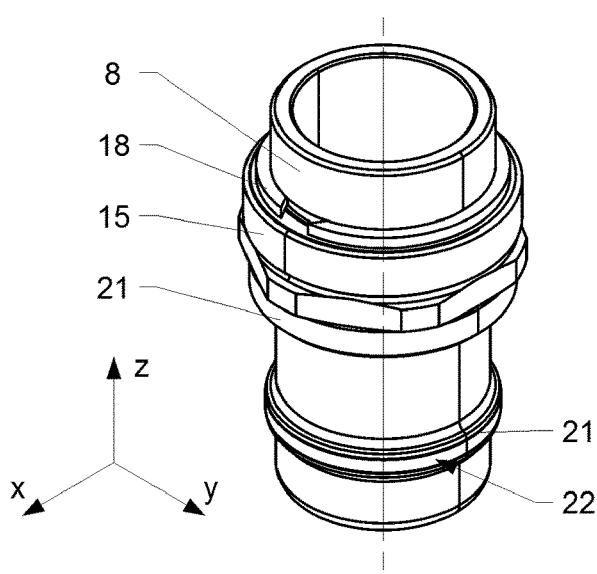
FIG. 5 shows the nozzle bushing of FIG. 3 with a second variation of an operative connection means in an exploded illustration.
Figure 6:
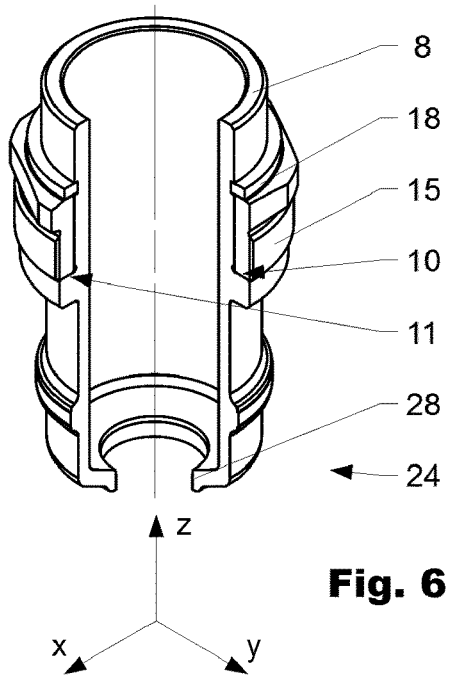
FIG. 6 shows the nozzle bushing of FIG. 3 with the second variation of the operative connection means of FIG. 5, which has been slid onto the nozzle bushing in a further orientation, with a detail illustrating the internal construction.

In FIGS. 5 and 6, and also FIGS. 3 and 4, the same components are depicted in each case, but the operative connection means 9 has been slid onto the nozzle bushing 8 in two different orientations, such that the operative connection means 9 can be connected to the cavity plate 5 or the nozzle plate 2.

It is apparent in FIGS. 1, 2, 4 and 6 to 8 that the nozzle bushing 8 is configured so as to taper in cross section, at least in one portion, in the direction of the melt flow (−z). Furthermore, the nozzle bushing 8 comprises a seat 26 for the cavity-side end of the injection molding nozzle 4. In this way, in the assembled state, the nozzle bushing 8 functions as a positioning aid, protection and holder for the injection molding nozzle 4 used. In addition, the nozzle bushing comprises a first sealing means 16, which cooperates in a sealing manner with an inner surface 20 of the second through-hole 7 in the assembled state. The first sealing means is arranged on an outer surface 29 of the nozzle bushing 8 and includes a circumferential bead 21 with a first sealing surface 22. Alternatively, the first sealing means 16 includes an O-ring, as illustrated in FIG. 7. The first sealing means 16 is arranged in the longitudinal direction z of the nozzle bushing 8, in a range of 20% to 80%, between the cavity-side end 24 of the nozzle bushings 8 and the second stop surface 11.

A variation of a second sealing means 25, which is arranged between the nozzle bushing 8 and an inner surface 20 of the second through-bore 7 and/or the injection molding nozzle 4 in the assembled state, can be seen in each case in FIGS. 2 and 7. In this case, the second sealing means 25 is arranged in the region of the tapered portion of the nozzle bushing 8. FIGS. 2, 4, 6 and 7 show a nozzle bushing 8 with a third sealing means 28, which is arranged in the region of the outlet opening of the injection molding nozzle 4 between the cavity-side end 27 of the injection molding nozzle 4 and the nozzle bushing 8 and cooperates in a sealing manner with the injection molding nozzle 4. In the variations illustrated, the third sealing means 28 includes a circumferential sealing surface which makes contact with the injection molding nozzle 4 in a circumferential manner.

FIG. 7 shows a perspective sectional illustration of a second variation of an injection molding tool 1 with an actively cooled second embodiment of the nozzle bushing 8. A hollow space running around the nozzle bushing 8 between the first and the second sealing means 16, 25 is part of a coolant channel 30, the supply and discharge lines of which are arranged in the cavity plate. Furthermore, part of the coolant channel 30 is delimited by an inner surface 20 of the second through-hole 7 and an outer surface 29 of the nozzle bushing 8.

FIGS. 3 to 6 show a nozzle bushing 8 which is rotationally symmetrical about its longitudinal axis. However, in variations, the injection molding tool 1 includes an anti-rotation means 33, which cooperates with the nozzle bushing 8 and the operative connection means 9 and/or the nozzle plate 2 and/or the cavity plate 5 and prevents the nozzle bushing 8 from rotating about the axial direction z or about its longitudinal axis. This is illustrated in FIG. 7.

LIST OF REFERENCE DESIGNATIONS

| | |
|---|---|
| 1 | Injection molding tool |
| 2 | Nozzle plate |
| 3 | First through-hole |
| 4 | Injection molding nozzle |
| 5 | Cavity plate |
| 6 | Cavity half |
| 7 | Second through-hole |
| 8 | Nozzle bushing |
| 9 | Operative connection means |
| 10 | First stop surface |
| 11 | Second stop surface |
| 12 | Flange plate |
| 13 | Central opening (operative connection means) |
| 14 | Screws |
| 15 | Threaded bushing |
| 16 | First sealing means (nozzle bushing) |
| 17 | Securing means |
| 18 | Snap ring |
| 20 | Inner surface (second through-hole) |
| 21 | Bead |
| 22 | First sealing surface |
| 24 | Cavity-side end/nozzle bushing tip |
| 25 | Second sealing means |
| 26 | Seat |
| 27 | Cavity-side end of the injection molding nozzle 4 |
| 28 | Third sealing means |
| 29 | Outer surface (nozzle bushing) |
| 30 | Coolant channel |
| 31 | Cable channel |
| 32 | Cabling |
| 33 | Anti-rotation means |

The invention claimed is:

1. An injection molding tool through which a melt flows, having
   a. a nozzle plate which comprises a first through-hole in an axial direction, in which in the first through-hole an injection molding nozzle is arranged extending in the axial direction, and
   b. a cavity plate which comprises at least one cavity half into which a second through-hole, which is arranged in the cavity plate and coaxially with respect to the first through-hole, opens, wherein
   c. a nozzle bushing, which encloses the injection molding nozzle at least in regions in the assembled state, is arranged in the second through-hole, wherein
   d. the nozzle bushing is operatively connected to the cavity plate and/or the nozzle plate by an operative connection means, wherein
   e. the nozzle bushing and the operative connection means are operatively connected to one another at least in the axial direction,
   wherein the operative connection means
   includes a flange plate which comprises a central opening in which the nozzle bushing is arranged, wherein the flange plate is fastened to the nozzle plate and/or the cavity plate in the axial direction by means of one or more screws, or
   includes a threaded bushing which comprises a central opening in which the nozzle bushing is arranged, wherein the threaded bushing is screwed to the nozzle plate and/or the cavity plate in the axial direction by way of a threaded connection.

2. The injection molding tool according to claim 1, wherein the operative connection means is arranged between the nozzle plate and the cavity plate.

3. The injection molding tool according to claim 1, wherein the central opening can slide onto the nozzle bushing with the operative connection means in two orientations relative to the nozzle bushing.

4. The injection molding tool according to claim 1, wherein the operative connection means comprises a first stop surface and the nozzle bushing comprises a second stop surface, which, in the assembled state, prevents the nozzle bushing from being displaced in relation to the cavity plate counter to the direction of the melt flow.

5. The injection molding tool according to claim 1, wherein a securing means cooperates with the nozzle bushing in the assembled state and prevents the nozzle bushing from being displaced in relation to the operative connection means in the direction of the melt flow.

6. The injection molding tool according to claim 5, wherein the securing means includes at least one of the following elements: a snap ring, and a threaded nut.

7. The injection molding tool according to claim 1, wherein the nozzle bushing comprises a first sealing means, which cooperates in a sealing manner with an inner surface of the second through-hole in the assembled state.

8. The injection molding tool according to claim 7, wherein the first sealing means includes at least one of the following elements: a circumferential bead with a first sealing surface, and an O-ring.

9. The injection molding tool according to claim 7, wherein the first sealing means is arranged in the longitudinal direction of the nozzle bushing, in a range of 20% to 80%, between a cavity-side end of the nozzle bushings and a second stop surface.

10. The injection molding tool according to claim 7, wherein a second sealing means is arranged, in the assembled state, between the nozzle bushing and an inner surface of the second through-hole and/or the injection molding nozzle.

11. The injection molding tool according to claim 1, wherein the nozzle bushing is configured so as to taper in cross section, at least in one portion, in the direction of the melt flow.

12. The injection molding tool according to claim 1, wherein the nozzle bushing comprises a seat for the cavity-side end of the injection molding nozzle.

13. The injection molding tool according to claim 12, wherein the nozzle bushing includes a third sealing means, which is arranged between the cavity-side end of the injection molding nozzle and the nozzle bushing end cooperates in a sealing manner with the injection molding nozzle.

14. The injection molding tool according to claim 1, wherein, between the first sealing means and the second sealing means, an inner surface of the second through-hole and an outer surface of the nozzle bushing delimit part of a coolant channel.

15. The injection molding tool according to claim 1, wherein the nozzle plate and the cavity plate delimit a cable channel which is arranged between them and through which cabling for the injection molding nozzle is routed.

16. The injection molding tool according to claim 1, wherein an anti-rotation means cooperates with the nozzle bushing and the operative connection means and/or the nozzle plate and/or the cavity plate and prevents the nozzle bushing from rotating about the axial direction.

17. A nozzle bushing and operative connection means for use with the injection molding tool according to claim 1.

* * * * *